(12) United States Patent
Moon et al.

(10) Patent No.: US 11,604,348 B2
(45) Date of Patent: Mar. 14, 2023

(54) LIQUID LENS, CAMERA MODULE INCLUDING THE SAME, AND METHOD FOR CONTROLLING THE LIQUID LENS

(71) Applicants: LG INNOTEK CO., LTD., Seoul (KR); CORNING INCORPORATED, Corning, NY (US)

(72) Inventors: Young Seop Moon, Seoul (KR); Young Woon Kim, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 82 days.

(21) Appl. No.: 17/057,583

(22) PCT Filed: May 23, 2019

(86) PCT No.: PCT/KR2019/006165
§ 371 (c)(1),
(2) Date: Nov. 20, 2020

(87) PCT Pub. No.: WO2019/225974
PCT Pub. Date: Nov. 28, 2019

(65) Prior Publication Data
US 2021/0208388 A1    Jul. 8, 2021

(30) Foreign Application Priority Data

May 23, 2018    (KR) .................. 10-2018-0058365

(51) Int. Cl.
*G02B 26/08*    (2006.01)
*G02B 3/14*    (2006.01)
*H05B 1/02*    (2006.01)

(52) U.S. Cl.
CPC .......... *G02B 26/0875* (2013.01); *G02B 3/14* (2013.01); *H05B 1/0244* (2013.01)

(58) Field of Classification Search
CPC .......... G02B 26/005; G02B 3/12; G02B 1/06; G02B 3/14; G02B 26/004
See application file for complete search history.

(56) References Cited

U.S. PATENT DOCUMENTS

2009/0086331 A1    4/2009    Gunasekaran et al.
2012/0024954 A1    2/2012    Komi
2018/0292725 A1*   10/2018   Moon .................. G02B 26/005

FOREIGN PATENT DOCUMENTS

CN    1455878 A    11/2003
EP    2 514 529 A2    10/2012
(Continued)

*Primary Examiner* — Joseph P Martinez
(74) *Attorney, Agent, or Firm* — Birch, Stewart, Kolasch & Birch, LLP

(57) ABSTRACT

A liquid lens includes a first plate including a cavity accommodating a conductive liquid and a non-conductive liquid; second and third plates disposed above and below the first plate, respectively, the second and third plates defining the cavity together with the first plate; a common electrode disposed so as to extend to the conductive liquid from a position between the first plate and the third plate; a plurality of individual electrodes disposed between the first plate and the second plate, the plurality of individual electrodes being electrically isolated from each other; and a temperature-sensing unit disposed inside at least one of the first plate, the second plate, or the third plate.

17 Claims, 9 Drawing Sheets

(56) References Cited

FOREIGN PATENT DOCUMENTS

| | | | |
|---|---|---|---|
| EP | 3 789 822 A1 | 3/2021 | |
| JP | 2007-310224 A | 11/2007 | |
| JP | 2008-304792 A | 12/2008 | |
| JP | 2009-025523 * | 2/2009 | ............ G02B 3/14 |
| JP | 2009-25523 A | 2/2009 | |
| JP | 2010-262246 A | 11/2010 | |
| JP | 2010-286740 A | 12/2010 | |
| JP | 2012-230105 A | 11/2012 | |
| JP | 2020-516936 A | 6/2020 | |
| KR | 10-2012-0045517 A | 5/2012 | |
| KR | 10-1821189 B1 | 1/2018 | |
| KR | 10-2018-0047581 A | 5/2018 | |
| WO | WO 2009/011384 A1 | 1/2009 | |

\* cited by examiner

[FIG. 1]
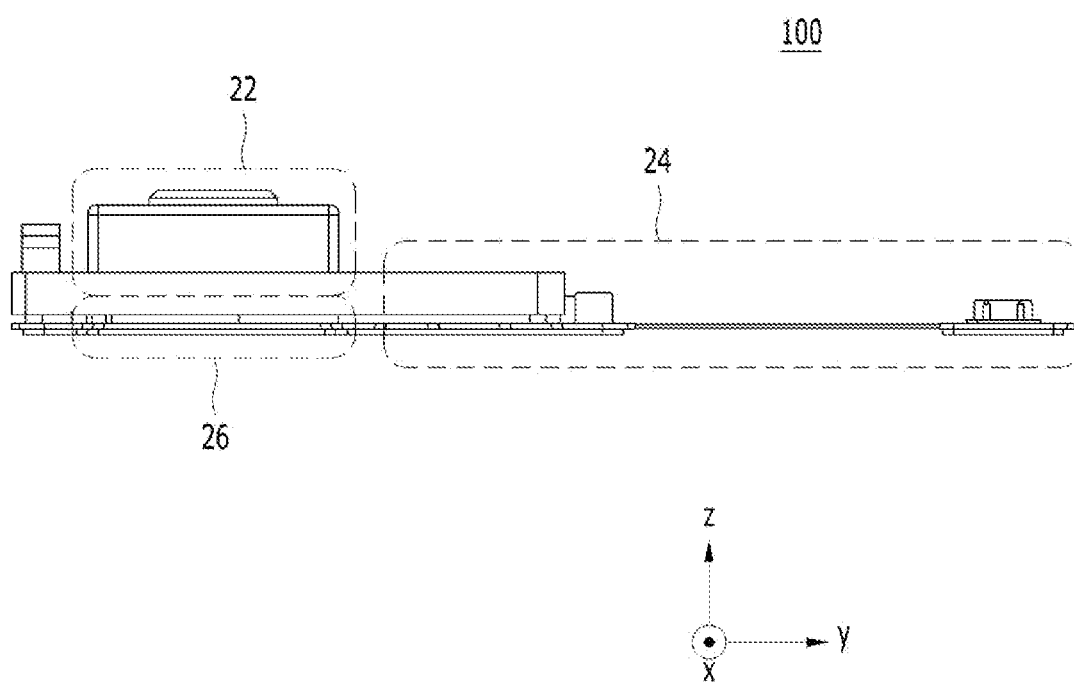

[FIG. 2]
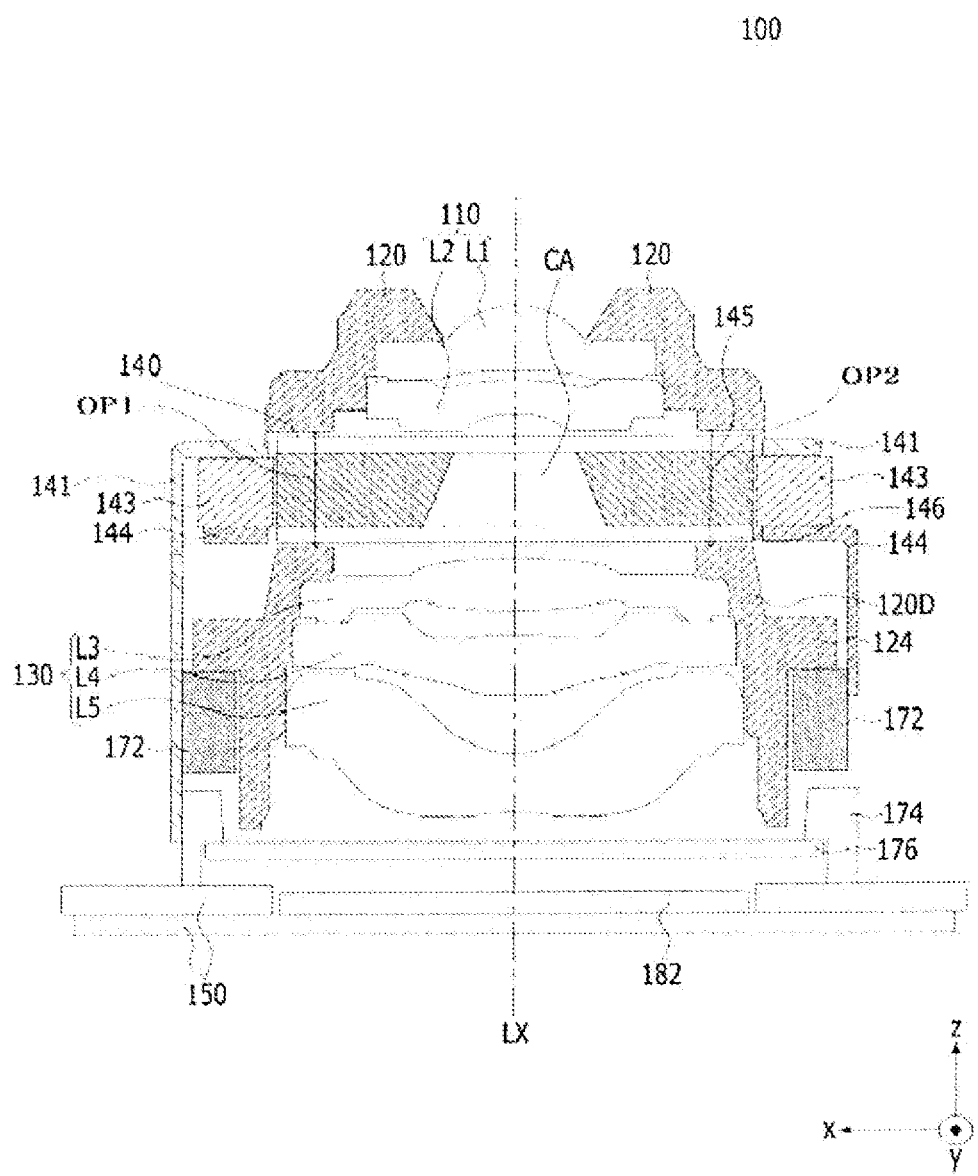

[FIG. 3]
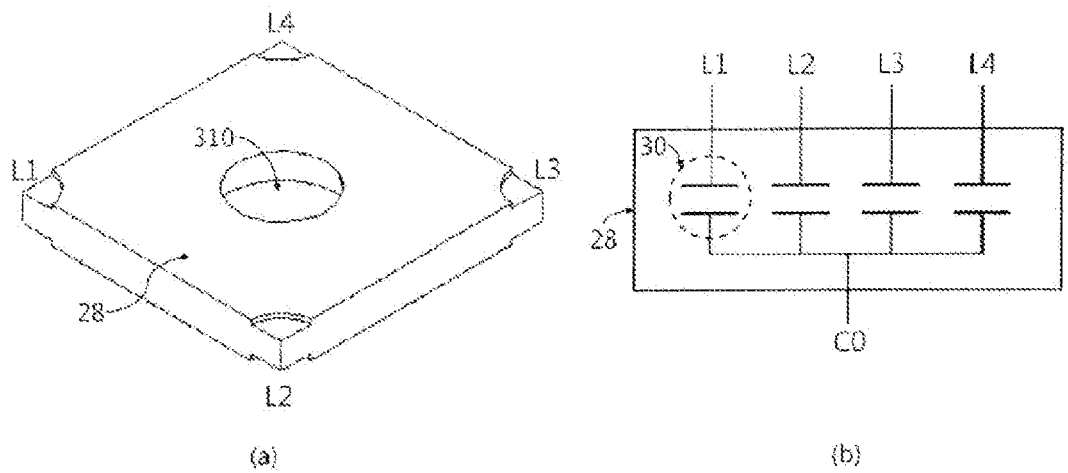
(a) (b)
[FIG. 4]
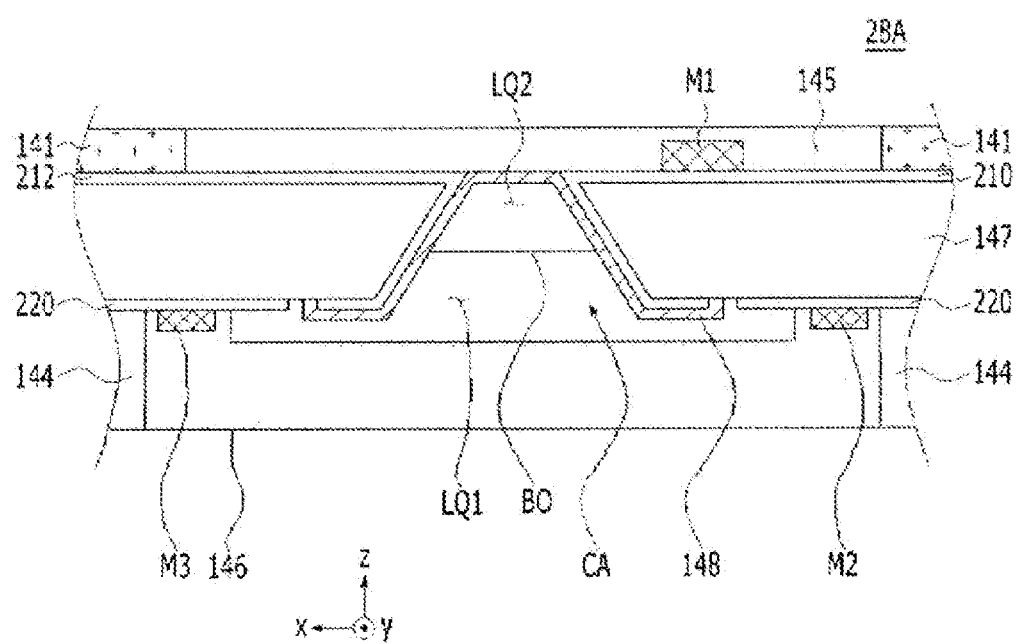

【FIG. 5】
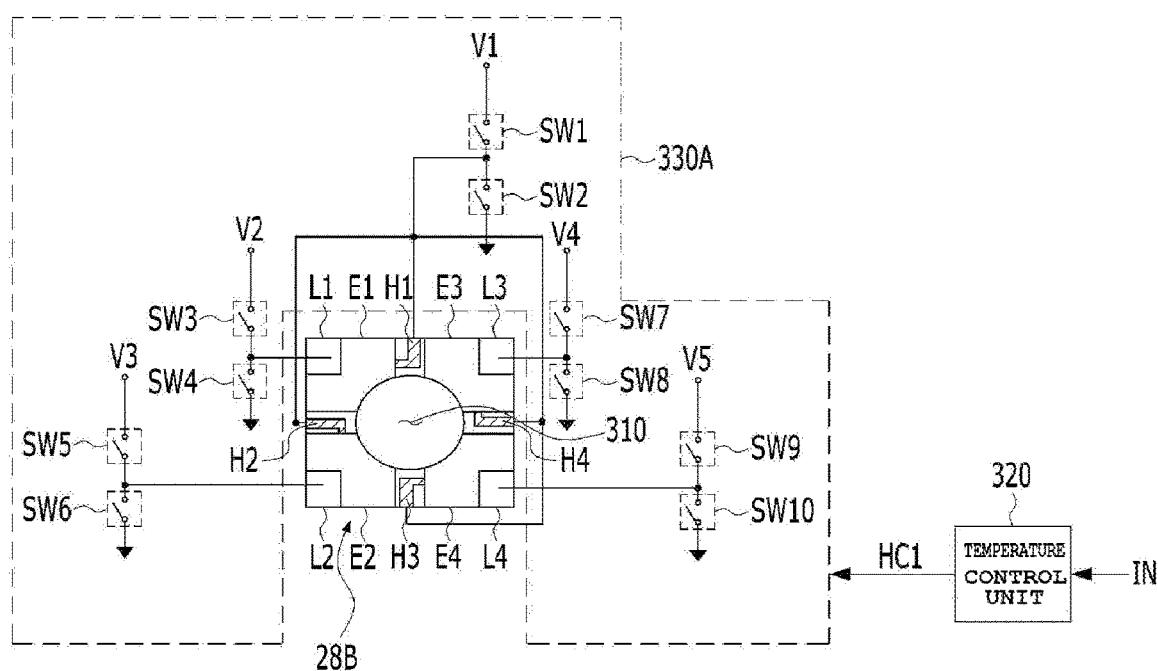

[FIG. 6]
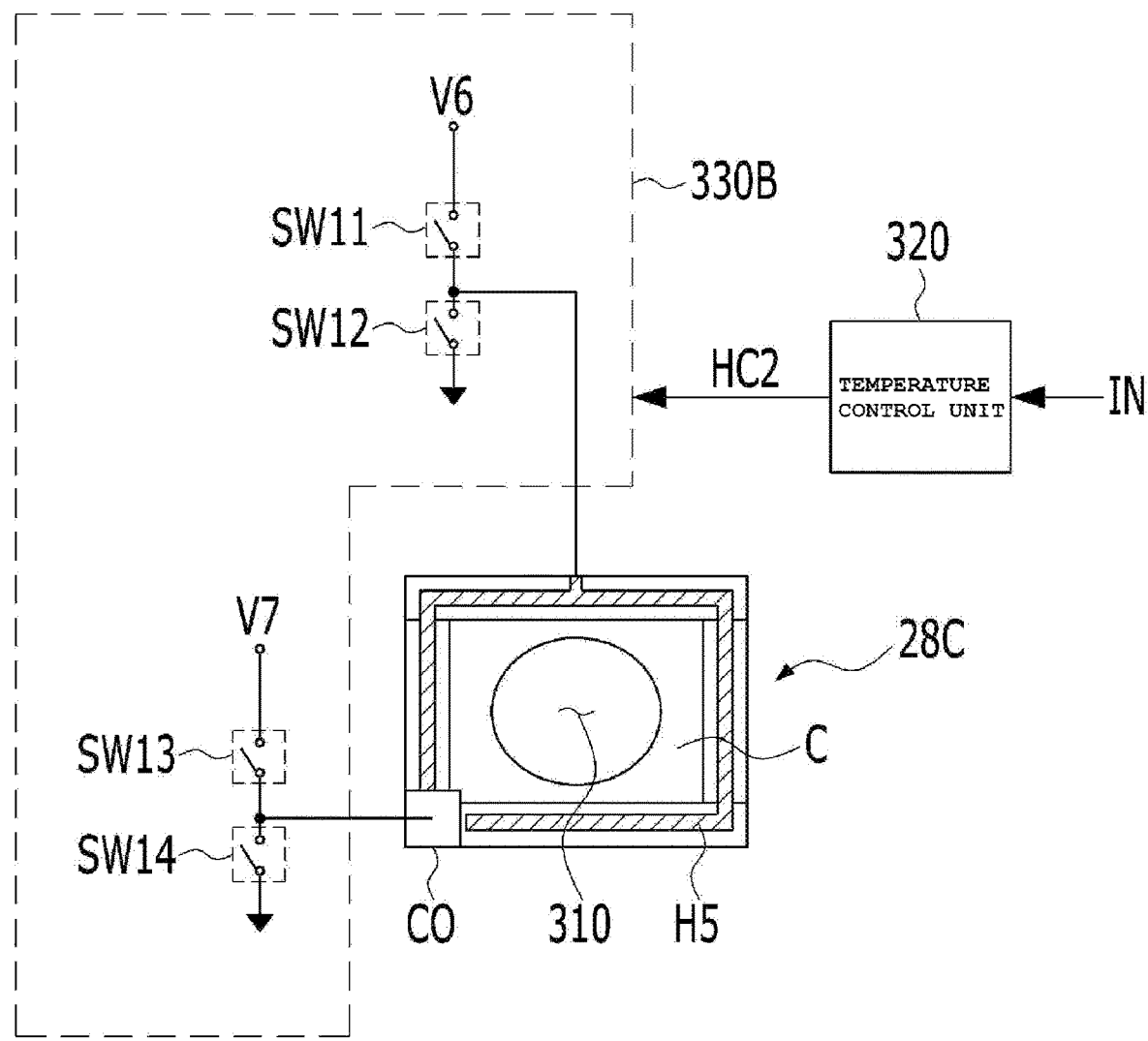

[FIG. 7]
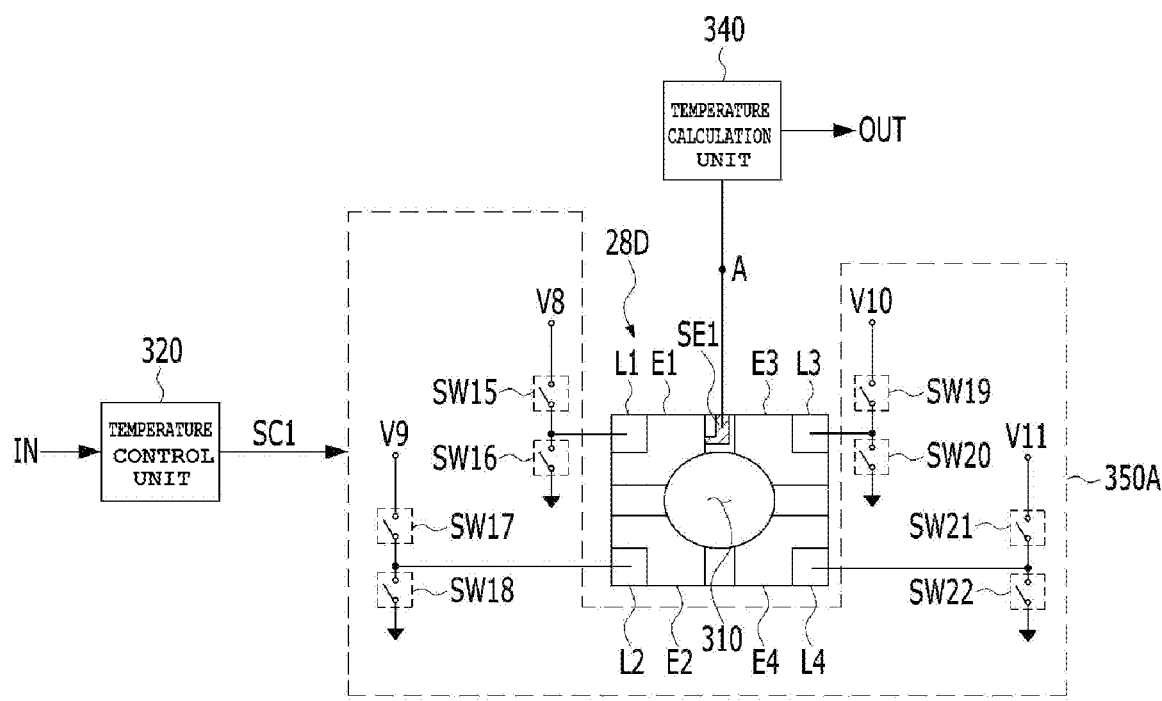

[FIG. 8]
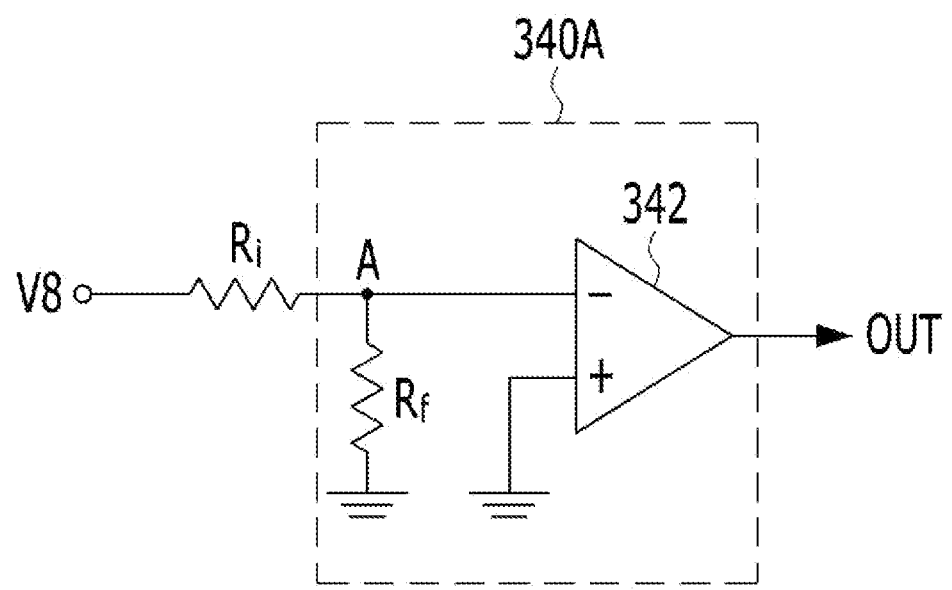

[FIG. 9]
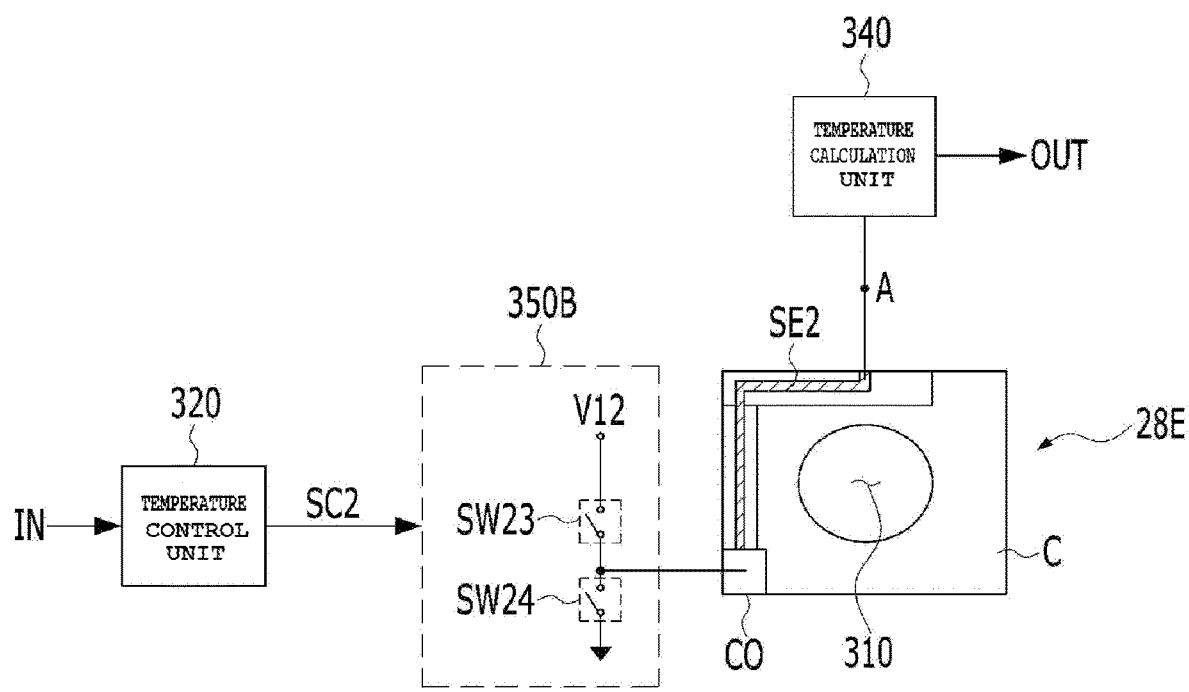

[FIG. 10]
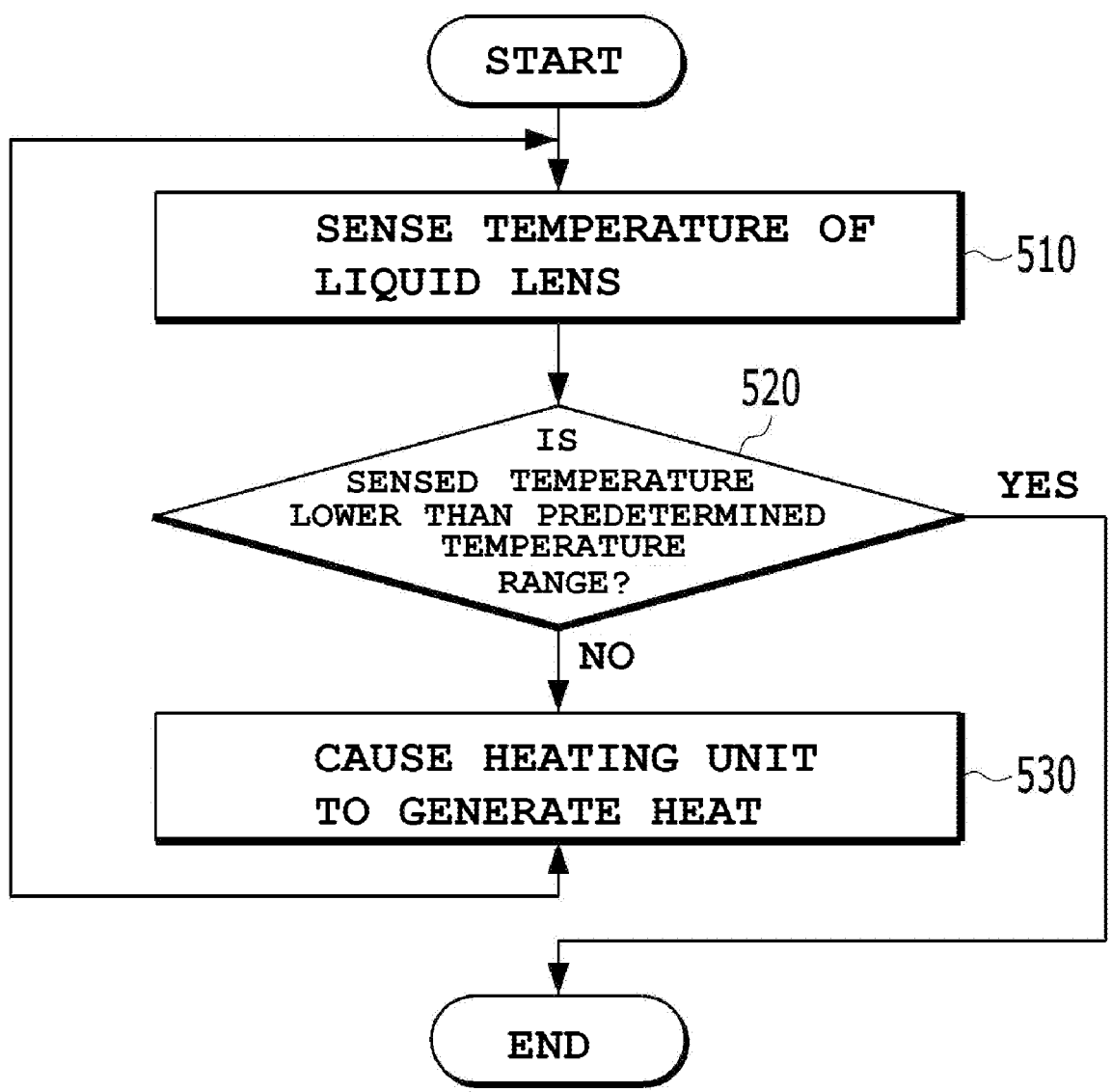

LIQUID LENS, CAMERA MODULE INCLUDING THE SAME, AND METHOD FOR CONTROLLING THE LIQUID LENS

CROSS REFERENCE TO RELATED APPLICATIONS

This application is the National Phase of PCT International Application No. PCT/KR2019/006165, filed on May 23, 2019, which claims priority under 35 U.S.C. 119(a) to Patent Application No. 10-2018-0058365, filed in the Republic of Korea on May 23, 2018, all of which are hereby expressly incorporated by reference into the present application.

TECHNICAL FIELD

Embodiments relate to a liquid lens, a camera module including the lens, and a method of controlling the liquid lens.

BACKGROUND ART

People who use portable devices demand optical devices that have high resolution, are small, and have various photographing functions (e.g. an optical zoom-in/zoom-out function, an auto-focusing (AF) function, a hand-tremor compensation or optical image stabilizer (OIS) function, etc.). These photographing functions may be realized by directly moving a plurality of lenses that are combined. In the case in which the number of lenses is increased, however, the size of an optical device may be increased. The auto-focusing function and the hand-tremor compensation function are performed by moving or tilting several lens modules, which are fixed to a lens holder so as to be aligned with an optical axis, along the optical axis or in a direction perpendicular to the optical axis, and a separate lens-moving apparatus is used to move the lens modules. However, the lens-moving apparatus consumes a lot of power, and a cover glass needs to be provided separately from a camera module in order to protect the lens-moving apparatus, thus leading to an increase in the overall thickness. Therefore, research has been conducted on a liquid lens configured to electrically adjust the curvature of an interface between two types of liquids in order to perform an auto-focusing function and a hand-tremor compensation function.

DISCLOSURE

Technical Problem

Embodiments provide a liquid lens enabling temperature detection and heat generation, a camera module including the liquid lens, and a method of controlling the liquid lens that is operated in the camera module.

Technical Solution

A liquid lens according to an embodiment may include a first plate including a cavity accommodating a conductive liquid and a non-conductive liquid, second and third plates disposed above and below the first plate, respectively, the second and third plates defining the cavity together with the first plate, a common electrode disposed so as to extend to the conductive liquid from the position between the first plate and the third plate, a plurality of individual electrodes disposed between the first plate and the second plate and electrically isolated from each other, and a temperature-sensing unit disposed inside at least one of the first plate, the second plate, or the third plate.

For example, the liquid lens may further include a heating unit disposed inside at least one of the first plate, the second plate, or the third plate.

For example, the heating unit may be disposed in contact with the common electrode or the individual electrodes.

For example, the temperature-sensing unit may be disposed in contact with the common electrode or the individual electrodes.

For example, the heating unit and the temperature-sensing unit may be integrated.

For example, one of the heating unit and the temperature-sensing unit may include metal.

For example, each of the heating unit and the temperature-sensing unit may include a resistor.

For example, at least one of the heating unit or the temperature-sensing unit may be integrated with one of the plurality of individual electrodes and the common electrode.

For example, the plurality of individual electrodes or the common electrode integrated with at least one of the heating unit or the temperature-sensing unit may have a patterned shape.

For example, the temperature-sensing unit or the heating unit may be disposed between adjacent individual electrodes in a plan view, and may be connected to one of the adjacent individual electrodes.

For example, the temperature-sensing unit or the heating unit may be disposed near the common electrode, and may be connected to a part of the common electrode.

A camera module according to another embodiment may include the liquid lens and a control circuit configured to control the temperature of the liquid lens. The control circuit may include a sensing voltage supply unit configured to supply a sensing voltage to the temperature-sensing unit in response to a sensing control signal, a heating voltage supply unit configured to supply a heating voltage to the heating unit in response to a heating control signal, a temperature calculation unit connected to the temperature-sensing unit to calculate the temperature of the liquid lens, and a temperature control unit configured to generate the sensing control signal and to generate the heating control signal in response to the calculated temperature.

For example, the temperature control unit may compare the calculated temperature with a predetermined temperature range, and may control the level or generation of the heating control signal based on the result of the comparison.

For example, the predetermined temperature range may be 20° C. to 60° C.

According to still another embodiment, a method of controlling a liquid lens operating in the camera module may include sensing the temperature of the liquid lens, determining whether the sensed temperature falls within a predetermined temperature range, and when the sensed temperature is lower than the predetermined temperature range, causing the heating unit to generate heat, and performing again the sensing the temperature.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

A liquid lens according to an embodiment has a substantially constant diopter at a temperature within a predetermined temperature range, and thus a camera module including the liquid lens is capable of preventing deterioration in the contrast ratio (or blur) of an image to be captured.

The effects achievable through the disclosure are not limited to the above-mentioned effects, and other effects not mentioned herein will be clearly understood by those skilled in the art from the following description.

DESCRIPTION OF DRAWINGS

FIG. 1 illustrates a schematic cross-sectional view of a camera module according to an embodiment.

FIG. 2 illustrates a cross-sectional view of an embodiment of the camera module shown in FIG. 1.

FIG. 3 illustrates a liquid lens, the focal length of which is adjusted in response to a driving voltage.

FIG. 4 illustrates a cross-sectional view of a liquid lens unit according to an embodiment.

FIG. 5 is a view for explaining a camera module according to an embodiment including a heating unit.

FIG. 6 is a view for explaining a camera module according to another embodiment including a heating unit.

FIG. 7 is a view for explaining a camera module according to still another embodiment including a temperature-sensing unit.

FIG. 8 illustrates a circuit diagram of an embodiment of the temperature calculation unit shown in FIG. 7.

FIG. 9 is a view for explaining a camera module according to another embodiment including a temperature-sensing unit.

FIG. 10 is a flowchart for explaining a liquid lens control method according to an embodiment.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

FIG. 1 illustrates a schematic cross-sectional view of a camera module according to an embodiment.

Hereinafter, a liquid lens and a camera module including the liquid lens according to embodiments will be described using the Cartesian coordinate system, but the embodiments are not limited thereto. That is, in the Cartesian coordinate system, the x-axis, the y-axis, and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 3. However, the liquid lens according to the embodiment may also be applied to a camera module having a configuration different from that of the camera module 100 shown in FIGS. 1 to 3.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a lens unit and a holder in which the lens unit is accommodated. As will be described below, the lens unit may include a liquid lens unit, and may further include a first lens unit or a second lens unit. Alternatively, the lens unit may include all of the first and second lens units and the liquid lens unit.

The control circuit 24 serves to supply a driving voltage (or an operation voltage) to the liquid lens unit.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

FIG. 2 illustrates a cross-sectional view of an embodiment of the camera module 100 shown in FIG. 1.

Referring to FIG. 2, the camera module 100 may include a lens assembly, a main board 150, and an image sensor 182. In addition, the camera module 100 may further include a middle base 172. In addition, the camera module 100 may further include a sensor base 174 and a filter 176, or may not include the sensor base 174 and the filter 176, as shown in FIG. 2.

According to the embodiment, at least one of the components 110 to 176 of the camera module 100 shown in FIG. 2 may be omitted. Alternatively, at least one component different from the components 110 to 176 shown in FIG. 2 may be further included in the camera module 100.

Referring to FIG. 2, the lens assembly may include at least one of a liquid lens unit 140, a holder 120, a first lens unit 110, or a second lens unit 130, and may correspond to the lens assembly 22 shown in FIG. 1. The lens assembly may be disposed on the main board 150.

In the lens assembly, the first lens unit 110 and the second lens unit 130 may be referred to as a 'first solid lens unit' and a 'second solid lens unit', respectively, in order to be distinguished from the liquid lens unit 140.

The first lens unit 110 may be disposed at the upper side of the lens assembly, and may be a region on which light is incident from outside the lens assembly. That is, the first lens unit 110 may be disposed above the liquid lens unit 140 within the holder 120. The first lens unit 110 may be implemented using a single lens, or may be implemented using two or more lenses that are aligned along a center axis to form an optical system.

Here, the center axis may be an optical axis LX of the optical system, which is formed by the first lens unit 110, the liquid lens unit 140, and the second lens unit 130 included in the camera module 100, or may be an axis parallel to the optical axis LX. The optical axis LX may correspond to the optical axis of the image sensor 182. That is, the first lens unit 110, the liquid lens unit 140, the second lens unit 130, and the image sensor 182 may be aligned along the optical axis LX through active alignment (AA).

Here, active alignment may mean an operation of aligning the optical axes of the first lens unit 110, the second lens unit 130, and the liquid lens unit 140 with each other and adjusting an axial relationship or distance relationship between the image sensor 182 and the lens units 110, 130 and 140 in order to acquire an improved image.

In addition, as illustrated in FIG. 2, the first lens unit 110 may include, for example, two lenses L1 and L2, but this is merely given by way of example, and the first lens unit 110 may include one lens, or three or more lenses.

In addition, an exposure lens may be disposed at the upper side of the first lens unit 110. Here, the exposure lens may be the outermost lens among the lenses included in the first lens unit 110. That is, the lens L1 located at the uppermost side of the first lens unit 110 may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

A first connection substrate 141 and a second connection substrate 144 are bent in the −z-axis direction. A spacer 143 may be disposed between the first connection substrate 141 and the second connection substrate 144, and may be disposed so as to protrude from at least one of a first or second opening OP1 or OP2 in the holder 120.

First and second holes may be formed respectively in the upper portion and the lower portion of the holder 120 to open the upper portion and the lower portion of the holder 120, respectively. The first lens unit 110 may be accommodated in, mounted in, seated in, in contact with, fixed to, provisionally fixed to, supported by, coupled to, or disposed in the first hole, which is formed in the holder 120, and the second lens unit 130 may be accommodated in, mounted in, seated in, in contact with, fixed to, provisionally fixed to, supported by, coupled to, or disposed in the second hole, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction.

The second lens unit 130 may be disposed below the liquid lens unit 140 within the holder 120. The second lens unit 130 may be spaced apart from the first lens unit 110 in the optical-axis direction (e.g. the z-axis direction).

The light introduced into the first lens unit 110 from outside the camera module 100 may pass through the liquid lens unit 140 and may be introduced into the second lens unit 130. The second lens unit 130 may be implemented using a single lens, or may be implemented using two or more lenses, which are aligned along the center axis to form an optical system. For example, as illustrated in FIG. 2, the second lens unit 130 may include three lenses L3, L4 and L5, but this is merely given by way of example, and two or fewer lenses or four or more lenses may be included in the second lens unit 130.

Unlike the liquid lens unit 140, each of the first lens unit 110 and the second lens unit 130 may be a solid lens formed of glass or plastic, but the embodiment is not limited as to a specific material of each of the first lens unit 110 and the second lens unit 130.

In addition, as shown in FIG. 2, the liquid lens unit 140 may include a first connection substrate 141, a liquid lens 142, a spacer 143, and a second connection substrate 144.

The first connection substrate 141 may electrically connect a plurality of individual electrodes (not shown) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of a plurality of individual electrodes. To this end, after the liquid lens unit 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a common electrode included in the liquid lens 142 to the main board 150, and may be disposed below the liquid lens 142. The second connection substrate 144 may be implemented as an FPCB or a single metal substrate (a conductive metal plate). Here, the individual electrodes and the common electrode will be described later in detail with reference to FIGS. 3 and 4.

The second connection substrate 144 may be electrically connected to an electrode pad, which is formed on the main board 150, via a connection pad, which is electrically connected to the common electrode. To this end, after the liquid lens unit 140 is inserted into the inner space of the holder 120, the second connection substrate 144 may be subjected to bending in the −z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The spacer 143 may be disposed so as to surround the liquid lens 142, and may protect the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). The reason for this is that the length of the spacer 143 in the x-axis direction may be greater than the length of the holder 120 in the x-axis direction.

In addition, a cover (not shown) may be disposed so as to surround the holder 120, the liquid lens unit 140, and the middle base 172, and may protect these components 120, 140 and 172 from external impacts. In particular, since the cover is disposed, a plurality of lenses, which form an optical system, may be protected from external impacts.

Meanwhile, the middle base 172 may be disposed so as to surround the second hole in the holder 120. To this end, the middle base 172 may include an accommodating hole (not shown) for accommodating the second hole therein. The inner diameter of the middle base 172 (i.e. the diameter of the accommodating hole) may be equal to or greater than the outer diameter of the second hole. The accommodating hole may be formed near the center of the middle base 172 at a position corresponding to the position of the image sensor 182, which is disposed in the camera module 100. The middle base 172 may be mounted on the main board 150 so as to be spaced apart from a circuit element on the main board 150. That is, the holder 120 may be disposed on the main board 150 so as to be spaced apart from the circuit element.

The main board 150 may be disposed below the middle base 172, and may include a recess in which the image sensor 182 may be mounted, seated, tightly disposed, fixed, provisionally fixed, supported, coupled, or accommodated, a circuit element (not shown), a connection part (or an FPCB) (not shown), and a connector (not shown).

The circuit element of the main board 150 may constitute a control module, which controls the liquid lens unit 140 and the image sensor 182. The circuit element may include at least one of a passive element or an active element, and may have any of various areas and heights. The plurality of circuit elements may be disposed so as not to overlap the holder 120 in the direction parallel to the optical axis LX. The main board 150 may be implemented as a rigid flexible printed circuit board (RFPCB) including an FPCB. The FPCB may be subjected to bending depending on the requirements of the space in which the camera module 100 is mounted.

The image sensor 182 may perform a function of converting the light that has passed through the first lens unit 110, the liquid lens unit 140, and the second lens unit 130 of the lens assembly 110, 120, 130 and 140 into image data. More specifically, the image sensor 182 may generate image data by converting light into analog signals via a pixel array including a plurality of pixels and synthesizing digital signals corresponding to the analog signals.

FIG. 3 illustrates a liquid lens, the focal length of which is adjusted in response to a driving voltage. Specifically, FIG. 3(a) illustrates a liquid lens 28 included in the lens assembly 22, and FIG. 3(b) illustrates an equivalent circuit of the liquid lens 28. Here, the liquid lens 28 may correspond to the liquid lens shown in FIG. 2.

First, referring to FIG. 3(a), the liquid lens 28, the focal length of which is adjusted in response to driving voltages, may receive driving voltages through sectors L1, L2, L3 and L4 of the individual electrodes (hereinafter referred to as 'individual electrode sectors'), which are disposed at the same angular interval from each other in four different directions. Here, the individual electrode sectors are parts of the individual electrodes, which are exposed without being covered by the second plate 145, as shown in FIG. 4, which will be described later. The individual electrode sectors L1, L2, L3 and L4 may be disposed at the same angular interval from each other with respect to the center axis of the liquid lens 28, and the number of individual electrode sectors may be four. The four individual electrode sectors may be disposed at the four corners of the liquid lens 28, respectively. When driving voltages (hereinafter referred to as 'individual voltages') are applied through the individual electrode sectors L1, L2, L3 and L4, the interface between the conductive liquid and the non-conductive liquid disposed in the lens region 310 may be deformed by the driving voltages, which are formed by the interaction between the applied individual voltages and the voltage applied to a common electrode sector C0 (hereinafter referred to as 'common voltage'), which will be described later. Here, the common electrode sector is a part of the common electrode C, which is exposed without being covered by the third plate 146, as shown in FIG. 4, which will be described later.

In addition, referring to FIG. 3(b), the liquid lens 28 may be constituted by a plurality of capacitors 30, one side of each of which receives an individual voltage from a corresponding one of the respectively different individual electrode sectors L1, L2, L3 and L4, and the other side of each of which is connected to the common electrode sector C0. Here, the capacitors 30 included in the equivalent circuit may have a low capacitance of about several tens to 200 picofarads (pF).

Hereinafter, the liquid lens unit 140 according to the embodiment will be described with reference to FIG. 4. Here, the liquid lens unit 140 may be included in the camera module 100 shown in FIG. 2, but the embodiment is not limited thereto.

FIG. 4 illustrates a cross-sectional view of a liquid lens unit 28A according to an embodiment.

The liquid lens unit 28A shown in FIG. 4 may include a first connection substrate 141, a liquid lens, a spacer 143, and a second connection substrate 144. An illustration of the spacer 143 is omitted from FIG. 4.

The liquid lens unit 28A shown in FIG. 4 may correspond to the liquid lens unit 140 shown in FIG. 2. Therefore, the first connection substrate 141, the liquid lens, and the second connection substrate 144 shown in FIG. 4 may respectively correspond to the first connection substrate 141, the liquid lens 142, and the second connection substrate 144 shown in FIG. 2, and thus a duplicate description thereof will be omitted.

The liquid lens may include a plurality of different types of liquids LQ1 and LQ2, first to third plates 147, 145 and 146, individual electrodes 210 and 212, a common electrode 220, and an insulation layer 148.

The liquid lens may include a cavity CA. As shown in FIG. 4, the open area in the direction in which light is introduced into the cavity CA may be smaller than the open area in the opposite direction. Alternatively, the liquid lens may be disposed such that the direction of inclination of the cavity CA is opposite what is illustrated. That is, unlike what is illustrated in FIG. 4, the open area in the direction in which light is introduced into the cavity CA may be greater than the open area in the opposite direction. In addition, when the liquid lens is disposed such that the direction of inclination of the cavity CA is opposite what is illustrated, the arrangement of all or some of the components included in the liquid lens may be changed, or only the direction of inclination of the cavity CA may be changed and the arrangement of the remaining components may not be changed, depending on the direction of inclination of the liquid lens.

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may be immiscible with each other, and an interface BO may be formed at the contact portion between the first and second liquids LQ1 and LQ2. For example, the second liquid LQ2 may be disposed on the first liquid LQ1, but the embodiment is not limited thereto.

The inner side surface of the first plate 147 may form a sidewall of the cavity CA. The first plate 147 may include upper and lower openings having a predetermined inclined surface. That is, the cavity CA may be defined as an area that is surrounded by the inclined surface of the first plate 147, a third opening that is in contact with the second plate 145, and a fourth opening that is in contact with the third plate 146. In this way, the cavity CA may be defined by the first to third plates.

The diameter of a wider opening among the third and fourth openings may be changed depending on the field of view (FOV) required for the liquid lens or the role of the liquid lens in the camera module 100. Each of the third and fourth openings may take the form of a hole having a circular cross-section. The interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is the area through which the light that has passed through the first lens unit 110 passes. Thus, the first plate 147 may be formed of a transparent material, or may include impurities so that light does not easily pass therethrough.

The individual electrodes 210 and 212 and the common electrode 220 may be respectively disposed on one surface and the other surface of the first plate 147. The individual electrodes 210 and 212 may be spaced apart from the common electrode 220, and may be disposed on one surface (e.g. the upper surface, the side surface, and the lower surface) of the first plate 147. That is, the individual electrodes 210 and 212 may be disposed between the first plate 147 and the second plate 145.

The common electrode 220 may be disposed on at least a portion of the other surface (e.g. the lower surface) of the first plate 147, and may be in direct contact with the first liquid LQ1. That is, the common electrode 220 may be disposed so as to extend to the conductive liquid LQ1 from the position between the first plate 147 and the third plate 146. Therefore, a portion of the common electrode 220, which is disposed on the other surface of the first plate 147, may be exposed to the first liquid LQ1, which is conductive.

Further, the individual electrodes 210 and 212 may be singular or plural in number. If the individual electrodes 210 and 212 are plural in number, the individual electrodes 210 and 212 may be electrically isolated from each other. Each of the individual electrode sensors and the common electrode sector described above may be at least one in number. For example, the individual electrode sectors L1 to L4 may be sequentially disposed in the clockwise direction (or in the counterclockwise direction) about the optical axis.

Each of the individual electrodes and the common electrode 210, 212 and 220 may be formed of a conductive material.

In addition, the second plate 145 may be disposed on one surface of each of the individual electrodes 210 and 212. That is, the second plate 145 may be disposed above the first plate 147. Specifically, the second plate 145 may be disposed on the upper surfaces of the individual electrodes 210 and 212 and the cavity CA.

The third plate 146 may be disposed on one surface of the common electrode 220. That is, the third plate 146 may be disposed below the first plate 147. Specifically, the third plate 146 may be disposed under the lower surface of the common electrode 220 and the cavity CA.

The second plate 145 and the third plate 146 may be disposed so as to face each other, with the first plate 147 interposed therebetween. In addition, at least one of the second plate 145 or the third plate 146 may be omitted.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured to allow the light introduced from the first lens unit 110 to travel into the cavity CA in the first plate 145.

The third plate 146 may be configured to allow the light that has passed through the cavity CA in the first plate 145 to travel to the second lens unit 130. The third plate 146 may be in direct contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

The insulation layer 148 may be disposed so as to cover a portion of the lower surface of the second plate 145 in the upper area of the cavity CA. That is, the insulation layer 148 may be disposed between the second liquid LQ2 and the second plate 145.

In addition, the insulation layer 148 may be disposed so as to cover portions of the individual electrodes 210 and 212, which form the sidewall of the cavity CA. In addition, the insulation layer 148 may be disposed on the lower surface of the first plate 147 so as to cover portions of the individual electrodes 210 and 212, the first plate 147, and the common electrode 220. Thus, contact between the individual electrodes 210 and 212 and the first liquid LQ1 and contact between the individual electrodes 210 and 212 and the second liquid LQ2 may be prevented by the insulation layer 148.

The insulation layer 148 may cover, among the individual and common electrodes 210, 212 and 220, one electrode (e.g. the individual electrodes 210 and 212), and may expose a portion of the other electrode (e.g. the common electrode 220) so that electrical energy is applied to the first liquid LQ1, which is conductive.

Meanwhile, referring to FIG. 4, the liquid lens 28A according to the embodiment may further include at least one of a temperature-sensing unit or a heating unit.

The temperature-sensing unit may be disposed inside at least one of the first plate 147, the second plate 145, or the third plate 146. For example, at least one of the first to third members M1, M2 and M3 shown in FIG. 4 may correspond to the temperature-sensing unit.

In addition, the heating unit may be disposed inside at least one of the first plate 147, the second plate 145, or the third plate 146. For example, at least one of the first to third members M1, M2 and M3 shown in FIG. 4 may correspond to the heating unit.

In addition, the heating unit may be disposed in contact with the common electrode 220 or the individual electrodes 210 and 212. For example, when at least one of the first to third members M1, M2 and M3 shown in FIG. 4 corresponds to the heating unit, the first member M1 may be disposed in contact with the first individual electrode 210, and each of the second and third members M2 and M3 may be disposed in contact with the common electrode 220.

Similarly, the temperature-sensing unit may be disposed in contact with the common electrode 220 or the individual electrodes 210 and 212. For example, when at least one of the first to third members M1, M2 and M3 shown in FIG. 4 corresponds to the temperature-sensing unit, the first member M1 may be disposed in contact with the individual electrode 210, and each of the second and third members M2 and M3 may be disposed in contact with the common electrode 220.

In addition, when the temperature-sensing unit is positioned as close to the liquids as possible or is disposed so as to be in contact with the individual electrode 210 and the common electrode 220, the temperatures of the liquids LQ1 and LQ2, which are volume expansion factors in the liquid lens, may be more accurately sensed. In addition, when the heating unit is positioned as close to the liquid lens as possible or is disposed so as to be in contact with the individual electrode 210 and the common electrode 220, the temperatures of the liquids LQ1 and LQ2 may be more quickly increased.

Further, the heating unit and the temperature-sensing unit may be integrated. For example, at least one of the first to third members M1, M2 and M3 shown in FIG. 4 may serve both as the heating unit and as the temperature-sensing unit.

In addition, each of the heating unit and the temperature-sensing unit may include a resistor. For example, at least one of the first to third members M1, M2 and M3 shown in FIG. 4 may be implemented as a resistor. The resistance of this resistor may range from several $\Omega$ to several k$\Omega$.

In addition, one of the heating unit and the temperature-sensing unit may include metal. The reason for this is that a metal component has resistance. For example, at least one of the first to third members M1, M2 and M3 shown in FIG. 4 may be made of a metal material. In this way, since one of the heating unit and the temperature-sensing unit is made of metal, one of the common electrode 220 and the individual electrodes 210 and 212, which are made of metal, may serve as at least one of the heating unit or the temperature-sensing unit. In this case, a separate heating unit or a separate temperature-sensing unit (e.g. the first to third members M1 to M3) may be omitted.

If at least one of the heating unit or the temperature-sensing unit is integrated with at least one of the individual electrodes 210 and 212 or the common electrode 220, the individual electrodes 210 and 212 or the common electrode 220 may have a patterned shape. Therefore, the individual electrodes 210 and 212 or the common electrode 220 may be implemented as a resistor for temperature detection and heat generation by performing patterning using the metal resistance of the individual electrodes 210 and 212 or the common electrode 220.

Hereinafter, a camera module according to an embodiment including the liquid lens unit 28A according to the above-described embodiment will be described with reference to the accompanying drawings. Hereinafter, for convenience of description, the liquid lens of the liquid lens unit according to the embodiment, which is denoted by reference numerals 28B to 28E, will be described.

FIG. 5 is a view for explaining a camera module according to an embodiment including a heating unit. FIG. 5 illustrates a plan view of a liquid lens 28B.

The camera module shown in FIG. 5 may include a liquid lens 28B and a control circuit.

The liquid lens 28B shown in FIG. 5 may correspond to the liquid lens 28A shown in FIG. 4. The liquid lens 28B may include individual electrodes E1 to E4 and heating units H1 to H4. The individual electrodes E1 to E4 may correspond to the individual electrodes 210 and 212 shown in FIG. 4, and each of the heating units H1 to H4 may correspond to any one of the first to third members M1 to M3, but the embodiment is not limited thereto.

According to the embodiment, the heating unit may be disposed between adjacent individual electrodes in a plan view, and may be connected to one of the adjacent individual electrodes. For example, as shown in FIG. 5, the heating unit may include first to fourth heating units H1 to H4. The first heating unit H1 may be disposed between the adjacent first and third individual electrodes E1 and E3, and may be connected to the first individual electrode E1. The second heating unit H2 may be disposed between the adjacent first and second individual electrodes E1 and E2, and may be connected to the second individual electrode E2. The third heating unit H3 may be disposed between the adjacent second and fourth individual electrodes E2 and E4, and may be connected to the fourth individual electrode E4. The fourth heating unit H4 may be disposed between the adjacent third and fourth individual electrodes E3 and E4, and may be connected to the third individual electrode E3.

Hereinafter, the heating unit will be described as including four heating units, namely the first to fourth heating units H1 to H4, but the embodiment is not limited thereto. That is, the following description may also apply to the case in which the number of heating units is larger or smaller than four.

Further, the control circuit shown in FIG. 5 corresponds to an embodiment of the control circuit 24 shown in FIG. 1, and serves to control the temperature of the liquid lens 28B. To this end, the control circuit may include a temperature control unit 320 and a heating voltage supply unit 330A.

The heating voltage supply unit 330A supplies a heating voltage to each of the first to fourth heating units H1 to H4 in response to a first heating control signal HC1 output from the temperature control unit 320. At this time, the levels of the heating voltages supplied to the first to fourth heating units H1 to H4 may be the same as or different from one another.

To this end, the heating voltage supply unit 330A may include first to fifth supply voltage sources V1 to V5 and a plurality of switches SW1 to SW10. The first and second switches SW1 and SW2 may be connected in series between the first heating voltage V1 and a reference potential (e.g. ground voltage), the third and fourth switches SW3 and SW4 may be connected in series between the second heating voltage V2 and the reference potential (e.g. ground voltage), the fifth and sixth switches SW5 and SW6 may be connected in series between the third heating voltage V3 and the reference potential (e.g. ground voltage), the seventh and eighth switches SW7 and SW8 may be connected in series between the fourth heating voltage V4 and the reference potential (e.g. ground voltage), and the ninth and tenth switches SW9 and SW10 may be connected in series between the fifth heating voltage V5 and the reference potential (e.g. ground voltage).

The operation of the heating voltage supply unit 330A having the above-described configuration will be described below.

First, when it is intended to supply a heating voltage to each of the first to fourth heating units H1 to H4, the first, fourth, sixth, eighth and tenth switches SW1, SW4, SW6, SW8 and SW10 are turned on (i.e. switched on), and the second, third, fifth, seventh and ninth switches SW2, SW3, SW5, SW7 and SW9 are turned off (i.e. switched off) in response to the first heating control signal HC1. Accordingly, a path through which the first heating voltage V1 is supplied to each of the first to fourth heating units H1 to H4 is formed, and thus the first to fourth heating units H1 to H4 generate heat, thereby increasing the temperature of the liquid lens 28B. At this time, the temperature of the heat generated by each of the first to fourth heating units H1 to H4 may be increased or decreased by increasing or decreasing the level of the first heating voltage V1.

In addition, when it is not intended to supply a heating voltage to each of the first to fourth heating units H1 to H4, the first switch SW1 may be turned off, and the second switch SW2 may be turned on in response to the first heating control signal HC1. Accordingly, the paths through which the first heating voltage V1 is supplied to the first to fourth heating units H1 to H4 may be blocked, and thus the heating operation of the first to fourth heating units H1 to H4 may be stopped.

In addition, when the heating operation is not performed, the first heating control signal HC1 may serve as a driving control signal for driving the individual electrodes E1 to E4. That is, when it is intended to drive the individual electrodes E1 to E4, the first, fourth, sixth, eighth and tenth switches SW1, SW4, SW6, SW8 and SW10 may be turned off, and the second, third, fifth, seventh and ninth switches SW2, SW3, SW5, SW7 and SW9 may be turned on in response to the driving control signal. Accordingly, the second, third, fourth and fifth heating voltages V2, V3, V4 and V5 are respectively supplied to the individual electrode sectors L1 to L4 of the first to fourth individual electrodes E1 to E4, whereby the first to fourth individual electrodes E1 to E4 may be driven. At this time, the levels of the first to fourth heating voltages may be the same as or different from one another.

As described above with reference to FIG. 5, the heating voltage supply unit 330A may perform both a function of causing the first to fourth heating units H1 to H4 to generate heat and a function of driving the individual electrodes E1 to E4. In this way, when configuration is made such that the two functions are performed using a single circuit, the number of components of the control circuit may be reduced.

However, according to another embodiment, the heating voltage supply unit 330A may perform only the function of causing the first to fourth heating units H1 to H4 to generate heat, and a circuit for driving the individual electrodes may be provided separately. In this case, the heating voltage supply unit 330A may include only the first supply voltage source V1 and the first and second switches SW1 and SW2.

FIG. 6 is a view for explaining a camera module according to another embodiment including a heating unit.

The camera module shown in FIG. 6 may include a liquid lens 28C and a control circuit.

The liquid lens 28C shown in FIG. 6 may correspond to the liquid lens included in the liquid lens unit 28A shown in FIG. 4. The liquid lens 28C may include a common electrode C and a fifth heating unit H5. The common electrode C may correspond to the common electrode 220 shown in FIG. 4, and the heating unit H5 may correspond to any one of the first to third members M1 to M3, but the embodiment is not limited thereto.

According to the embodiment, the heating unit may be disposed near the common electrode C, and may be connected to a part of the common electrode C, i.e. the common electrode sector CO. For example, as shown in FIG. 6, the fifth heating unit H5 may include a bottom having a shape surrounding the entire periphery of the common electrode C, and may be connected to the common electrode sector CO.

Further, the control circuit shown in FIG. 6 corresponds to another embodiment of the control circuit 24 shown in FIG. 1, and serves to control the temperature of the liquid lens 28C. To this end, the control circuit may include a temperature control unit 320 and a heating voltage supply unit 330B.

The heating voltage supply unit 330B may supply a heating voltage to the fifth heating unit H5 in response to a second heating control signal HC2 output from the temperature control unit 320. To this end, the heating voltage supply unit 330B may include sixth and seventh supply voltage sources V6 and V7 and a plurality of switches SW11 to SW14. The eleventh and twelfth switches SW11 and SW12 may be connected in series between the sixth heating voltage V6 and a reference potential (e.g. ground voltage), and the thirteenth and fourteenth switches SW13 and SW14 may be connected in series between the seventh heating voltage V7 and the reference potential (e.g. ground voltage).

The operation of the heating voltage supply unit 330B having the above-described configuration will be described below.

First, when it is intended to supply a heating voltage to the fifth heating unit H5, the eleventh and fourteenth switches SW11 and SW14 are turned on, and the twelfth and thirteenth switches SW12 and SW13 are turned off in response to the second heating control signal HC2. Accordingly, a path through which the sixth heating voltage V6 is supplied to the fifth heating unit H5 is formed, and thus the fifth heating unit H5 generates heat, thereby increasing the temperature of the liquid lens 28C. At this time, the temperature of the heat generated by the fifth heating unit H5 may be increased or decreased by increasing or decreasing the level of the sixth heating voltage V6.

In addition, when it is not intended to supply a heating voltage to the fifth heating unit H5, the eleventh switch SW11 may be turned off, and the twelfth switch SW12 may be turned on in response to the second heating control signal HC2. Accordingly, the path through which the sixth heating voltage V6 is supplied to the fifth heating unit H5 may be blocked, and thus the heating operation of the fifth heating unit H5 may be stopped.

In addition, when the heating operation is not performed, the second heating control signal HC2 may serve as a driving control signal for driving the common electrode C. That is, when it is intended to drive the common electrode C, the eleventh and fourteenth switches SW11 and SW14 may be turned off, and the twelfth and thirteenth switches SW12 and SW13 may be turned on in response to the driving control signal. Accordingly, the seventh heating voltage V7 may be supplied to the common electrode sector CO of the common electrode C, and thus the common electrode C may be driven.

As described above with reference to FIG. 6, the heating voltage supply unit 330B may perform both a function of causing the fifth heating unit H5 to generate heat and a function of driving the common electrode C. In this way, when configuration is made such that the two functions are performed using a single circuit, the number of components of the control circuit may be reduced.

However, according to another embodiment, the heating voltage supply unit 330B may perform only the function of causing the fifth heating unit H5 to generate heat, and a circuit for driving the common electrode C may be provided separately. In this case, the heating voltage supply unit 330B may include only the sixth supply voltage source V6 and the eleventh and twelfth switches SW11 and SW12.

FIG. 7 is a view for explaining a camera module according to still another embodiment including a temperature-sensing unit.

The camera module shown in FIG. 7 may include a liquid lens 28D and a control circuit.

The liquid lens 28D shown in FIG. 7 may correspond to the liquid lens included in the liquid lens unit 28A shown in FIG. 4. The liquid lens 28D may include individual electrodes E1 to E4 and a temperature-sensing unit SE1. The individual electrodes E1 to E4 may correspond to the individual electrodes 210 and 212 shown in FIG. 4, and the temperature-sensing unit SE1 may correspond to any one of the first to third members M1 to M3, but the embodiment is not limited thereto.

According to the embodiment, the temperature-sensing unit may be disposed between adjacent individual electrodes in a plan view, and may be connected to one of the adjacent individual electrodes. For example, as shown in FIG. 7, the temperature-sensing unit may include a first temperature-sensing unit SE1. The first temperature-sensing unit SE1 may be disposed between the adjacent first and third individual electrodes E1 and E3, and may be connected to the first individual electrode E1. Hereinafter, the temperature-sensing unit will be described as including only one first temperature-sensing unit SE1, but the embodiment is not limited thereto. That is, the following description may also apply to the case in which the temperature-sensing unit SE1 includes more than one temperature-sensing unit.

Further, the control circuit shown in FIG. 7 corresponds to still another embodiment of the control circuit 24 shown in FIG. 1, and serves to control the temperature of the liquid lens 28D. To this end, the control circuit may include a temperature control unit 320, a sensing voltage supply unit 350A, and a temperature calculation unit 340.

The sensing voltage supply unit 350A may supply a sensing voltage to the first temperature-sensing unit SE1 in response to a first sensing control signal SC1 output from the temperature control unit 320. To this end, the sensing voltage supply unit 350A may include eighth to eleventh supply voltage sources V8 to V11 and a plurality of switches SW15 to SW22. The fifteenth and sixteenth switches SW15 and SW16 may be connected in series between the eighth sensing voltage V8 and a reference potential (e.g. ground voltage), the seventeenth and eighteenth switches SW17 and SW18 may be connected in series between the ninth sensing voltage V9 and the reference potential (e.g. ground voltage), the nineteenth and twentieth switches SW19 and SW20 may be connected in series between the tenth sensing voltage V10 and the reference potential (e.g. ground voltage), and the twenty-first and twenty-second switches SW21 and SW22 may be connected in series between the eleventh sensing voltage V11 and the reference potential (e.g. ground voltage).

The operation of the sensing voltage supply unit 350A having the above-described configuration will be described below.

First, when it is intended to supply a sensing voltage to the first temperature-sensing unit SE1, the fifteenth switch SW15 is turned on, and the sixteenth switch SW16 is turned off in response to a first sensing control signal SC1. Accordingly, a path through which the eighth sensing voltage V8 is supplied to the first temperature-sensing unit SE1 may be formed, and thus the temperature calculation unit 340 may calculate the temperature of the liquid lens.

The temperature calculation unit 340 may be connected to the first temperature-sensing unit SE1 to calculate the temperature of the liquid lens 28D, and may output the calculated temperature to the temperature control unit 320 via an output terminal OUT. To this end, the temperature calculation unit 340 may be implemented in any of various forms.

FIG. 8 illustrates a circuit diagram of an embodiment 340A of the temperature calculation unit 340 shown in FIG. 7.

The temperature calculation unit 340A shown in FIG. 8 may include a reference resistor Rf and an operational amplifier 342. Here, for better understanding, the first temperature-sensing unit SE1 shown in FIG. 7 is shown as a variable resistor Ri, as an equivalent thereto.

The reference resistor Rf may include one side connected to the first temperature-sensing unit SE1 (Ri) and to a negative input terminal of the operational amplifier 342 and the other side connected to a reference potential (e.g. ground voltage). Here, the temperature calculation unit 340A may be connected to the first temperature-sensing unit SE1 shown in FIG. 7 at a contact point A. The operational amplifier 342 may include a positive input terminal, which is connected to the reference potential, and an output terminal OUT, through which the calculated temperature is output. The voltage VA at the contact point A may be expressed using Equation 1 below.

$$VA = V8 \times \frac{Rf}{(Ri + Rf)} \quad \text{[Equation 1]}$$

Here, the resistance value of Rf is set in advance. Accordingly, as expressed in Equation 1 set forth above, variation in Ri may be detected using the voltage output from the operational amplifier 342, and the calculated temperature may be output through the output terminal OUT.

That is, as the temperature of the liquid lens 28D changes, the resistance value Ri of the first temperature-sensing unit SE1 changes, and as the resistance value Ri changes, the output voltage OUT of the operational amplifier 342 changes. Accordingly, a change in the temperature of the liquid lens 28D may be predicted based on a change in the output voltage OUT. For example, the change in the temperature of the liquid lens 28D depending on the change in the output voltage OUT may be determined experimentally in advance.

Meanwhile, regardless of whether the sensing voltage is supplied to the first temperature-sensing unit SE1, the first sensing control signal SC1 may serve as a driving control signal for driving the individual electrodes E1 to E4. That is, when it is intended to drive the individual electrodes E1 to E4, the fifteenth, seventeenth, nineteenth and twenty-first switches SW15, SW17, SW19 and SW21 may be turned on, and the sixteenth, eighteenth, twentieth and twenty-second switches SW16, SW18, SW20 and SW22 may be turned off in response to the driving control signal SE1. Accordingly, the eighth, ninth, tenth and eleventh sensing voltages V8, V9, V10 and V11 may be respectively supplied to the individual electrode sectors L1 to L4 of the first to fourth individual electrodes E1 to E4, whereby the first to fourth individual electrodes E1 to E4 may be driven. At this time, the levels of the eighth to eleventh sensing voltages V8 to V11 may be the same as or different from one another.

As described above with reference to FIG. 7, the sensing voltage supply unit 350A may perform both a function of causing the first temperature-sensing unit SE1 to sense a temperature and a function of driving the individual electrodes E1 to E4. In this way, when configuration is made such that the two functions are performed using a single circuit, the number of components of the control circuit may be reduced.

However, according to another embodiment, the sensing voltage supply unit 350A may perform only the function of causing the first temperature-sensing unit SE1 to sense a temperature, and a circuit for driving the individual electrodes may be provided separately. In this case, the sensing voltage supply unit 350A may include only the eighth supply voltage source V8 and the fifteenth and sixteenth switches SW15 and SW16.

FIG. 9 is a view for explaining a camera module according to another embodiment including a temperature-sensing unit.

The camera module shown in FIG. 9 may include a liquid lens 28E and a control circuit.

The liquid lens 28E shown in FIG. 9 may correspond to the liquid lens of the liquid lens unit 28A shown in FIG. 4. The liquid lens 28E may include a common electrode C and a temperature-sensing unit SE2. The common electrode C may correspond to the common electrode 220 shown in FIG. 4, and the temperature-sensing unit SE2 may correspond to any one of the first to third members M1 to M3, but the embodiment is not limited thereto.

According to the embodiment, the temperature-sensing unit may be disposed near the common electrode C, and may be connected to a common electrode sector CO, which is a part of the common electrode C. For example, as shown in FIG. 9, the temperature-sensing unit may include a second temperature-sensing unit SE2, which is disposed near the common electrode C and is connected to the common electrode sector CO. Hereinafter, the temperature-sensing unit will be described as including only one second temperature-sensing unit SE2, but the embodiment is not limited thereto. That is, the following description may also apply to the case in which the temperature-sensing unit SE2 includes more than one temperature-sensing unit.

Further, the control circuit shown in FIG. 9 corresponds to still another embodiment of the control circuit 24 shown in FIG. 1, and serves to control the temperature of the liquid lens 28E. To this end, the control circuit may include a temperature control unit 320, a sensing voltage supply unit 350B, and a temperature calculation unit 340. Here, since the temperature control unit 320 and the temperature calculation unit 340 are the same as the temperature control unit 320 and the temperature calculation unit 340 shown in FIG. 7, the same reference numerals are assigned thereto, and a duplicate description thereof will be omitted. Therefore, the temperature calculation unit 340 shown in FIG. 9 may be implemented in the form shown in FIG. 8.

The sensing voltage supply unit 350B may supply a sensing voltage to the second temperature-sensing unit SE2 in response to a second sensing control signal SC2 output from the temperature control unit 320. To this end, the sensing voltage supply unit 350B may include a twelfth supply voltage source V12 and a plurality of switches SW23 and SW24. The twenty-third and twenty-fourth switches SW23 and SW24 may be connected in series between the twelfth sensing voltage V12 and a reference potential (e.g. ground voltage).

The operation of the sensing voltage supply unit 350B having the above-described configuration will be described below.

First, when it is intended to supply a sensing voltage to the second temperature-sensing unit SE2, the twenty-third switch SW23 is turned on, and the twenty-fourth switch SW24 is turned off in response to a second sensing control signal SC2. Accordingly, a path through which the twelfth sensing voltage V12 is supplied to the second temperature-sensing unit SE2 may be formed, and thus the temperature calculation unit 340 may calculate the temperature of the liquid lens.

The temperature calculation unit 340 may be connected to the second temperature-sensing unit SE2 to calculate the temperature of the liquid lens 28E, and may output the calculated temperature to the temperature control unit 320 via an output terminal OUT.

At this time, the second sensing control signal SC2 may serve as a driving control signal for driving the common electrode C. That is, when it is intended to drive the common electrode C, the twenty-third switch SW23 may be turned on, and the twenty-fourth switch SW24 may be turned off in response to the driving control signal. Accordingly, the twelfth sensing voltage V12 may be supplied to the common electrode sector CO of the common electrode C, and thus the common electrode C may be driven.

As described above with reference to FIG. 9, the sensing voltage supply unit 350B may perform both a function of causing the second temperature-sensing unit SE2 to sense a temperature and a function of driving the common electrode C. In this way, when configuration is made such that the two functions are performed using a single circuit, the number of components of the control circuit may be reduced.

Meanwhile, the temperature control unit 320 generates a first or second sensing control signal SC1 or SC2 such that the temperature calculation unit 340, as described above, senses the temperature of the liquid lens (e.g. 28D or 28E), and outputs the generated first or second sensing control signal SC1 or SC2 to the sensing voltage supply unit 350A or 350B.

In addition, the temperature control unit 320 may receive the temperature of the liquid lens (e.g. 28D or 28E), calculated by the temperature calculation unit 340, from the temperature calculation unit 340 via an input terminal IN, may analyze the temperature received from the temperature calculation unit 340, may generate a first or second heating control signal HC1 or HC2 in response to the result of analysis, and may output the generated first or second heating control signal HC1 or HC2 to the heating voltage supply unit 330A or 330B.

Hereinafter, a liquid lens control method of controlling the liquid lenses 28A to 28E according to the embodiments will be described with reference to FIG. 10.

FIG. 10 is a flowchart for explaining a liquid lens control method according to an embodiment.

The control method shown in FIG. 10 may be performed in the control circuit 24 shown in FIG. 1. The control method shown in FIG. 10 will be described with reference to FIGS. 5 to 9, but the embodiment is not limited thereto.

First, the temperature of the liquid lens is sensed (step 510). Step 510 may be performed by the temperature control unit 320, the temperature calculation unit 340, and the temperature-sensing unit SE1 or SE2 shown in FIG. 7 or 9. That is, the temperature control unit 320 may generate a first or second sensing control signal SC1 or SC2, and the temperature calculation unit 340 may sense the temperature of the liquid lens (e.g. 28D or 28E) in response to the first or second sensing control signal SC1 or SC2.

After step 510, it is determined whether the sensed temperature falls within a predetermined temperature range (step 520). Step 520 may be performed by the temperature control unit 320.

The temperature control unit 320 may compare the temperature calculated by the temperature calculation unit 340 with a predetermined temperature range, and may control at least one of the level of the first or second heating control signal HC1 or HC2 or generation thereof based on the result of the comparison. Here, the predetermined temperature range may be 20° C. to 60° C. The reason for this is that variation in the diopter of the liquid lens 28A to 28E within the temperature range of 20° C. to 60° C. is relatively small compared to that within other temperature ranges.

When the sensed temperature is lower than the predetermined temperature range, the heating unit generates heat, and the process goes to step 510 in order to again sense the temperature of the liquid lens 28A to 28E (Step 530). Step 530 may be performed by the temperature control unit 320, the heating voltage supply unit 330A or 330B, and the heating unit H1 to H5. That is, when the temperature of the liquid lens 28D or 28E, sensed by the temperature calculation unit 340 using the temperature-sensing unit SE1 or SE2, is lower than the predetermined temperature range, the temperature control unit 320 may control the heating unit H1 to H5 to generate heat using a first or second heating control signal HC1 or HC2. Thereafter, in order to perform step 510, the temperature control unit 320 controls the sensing voltage supply unit 350A or 350B to supply a sensing voltage using a first or second sensing control signal SC1 or SC2, and accordingly, the temperature calculation unit 340 senses the temperature of the liquid lens 28A to 28E again.

Even when the same level of driving voltage is applied to a liquid lens to drive the same, if the temperature of the liquid lens changes due to a change in the temperature outside the liquid lens, the diopter of the liquid lens changes. Accordingly, a camera module including the liquid lens undergoes a change in the focal point due to the temperature change, thus suffering from deterioration in the contrast ratio (or blur) of an image to be captured.

For example, in the case of a liquid lens that is in an initial state of 0° C., if the ambient temperature is gradually increased and the temperature of the liquid lens reaches 30° C., the volume of the liquid contained in the first plate increases, and the contact angle between the liquid and the inclined surface of the cavity changes, with the result that the diopter of the liquid lens changes from that in the initial state. When the temperature increases, not only the liquid but also the third plate 146, which has a small thickness, expands in the optical-axis direction (e.g. +z-axis direction). For example, when the diopter is zero and the temperature increases from 60° C. to 64° C., it is required to reduce the level of the voltage for driving the liquid lens from 41 volts to 38.5 volts, that is, by about 6%.

As described above, it can be seen that the characteristics of the liquid lens change depending on temperature. Therefore, the heating unit and the temperature-sensing unit are disposed inside the liquid lens (unit) 28A to 28E according to the embodiment in order to sense the temperature of the liquid lens using the temperature-sensing unit and, when the sensed temperature of the liquid lens is lower than the temperature range from 20° C. to 60° C., to cause the heating unit to generate heat so that the temperature of the liquid lens is adjusted so as to fall within the predetermined temperature range. Accordingly, the liquid lens according to the embodiment has a substantially constant diopter at a temperature within a predetermined temperature range, and consequently, a camera module including the liquid lens is capable of preventing deterioration in the contrast ratio (or blur) of an image to be captured.

Meanwhile, an optical device may be implemented using the camera module 100 including the liquid lens according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 100, a display unit (not shown) configured to output an image, a battery (not shown) configured to supply power to the camera module 100, and a body housing in which the camera module 100, the display unit, and the battery are mounted. The optical device may further include a communication module, which may communicate with other devices, and a memory unit, which may store data. The communication module and the memory unit may also be mounted in the body housing.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A liquid lens, a camera module including the lens, and a method of controlling the liquid lens according to embodiments may be used in camera/video devices, telescopic devices, microscopic devices, an interferometer, a photometer, a polarimeter, a spectrometer, a reflectometer, an autocollimator, a lens-meter, a smartphone, a laptop computer, a tablet computer, etc.

The invention claimed is:

1. A liquid lens, comprising:
a first plate comprising a cavity accommodating a conductive liquid and a non-conductive liquid;
second and third plates disposed above and below the first plate, respectively, the second and third plates defining the cavity together with the first plate;
a common electrode disposed so as to extend to the conductive liquid from a position between the first plate and the third plate;
a plurality of individual electrodes disposed between the first plate and the second plate, the plurality of individual electrodes being electrically isolated from each other; and
a temperature-sensing unit disposed inside at least one of the second plate or the third plate.

2. The liquid lens according to claim 1, further comprising:
a heating unit disposed inside at least one of the second plate or the third plate.

3. The liquid lens according to claim 2, wherein the heating unit and the temperature-sensing unit are integrated.

4. The liquid lens according to claim 2, wherein each of the heating unit and the temperature-sensing unit comprises a resistor.

5. A liquid lens, comprising:
a first plate comprising a cavity accommodating a conductive liquid and a non-conductive liquid;
second and third plates disposed above and below the first plate, respectively, the second and third plates defining the cavity together with the first plate;
a common electrode disposed so as to extend to the conductive liquid from a position between the first plate and the third plate;
a plurality of individual electrodes disposed between the first plate and the second plate, the plurality of individual electrodes being electrically isolated from each other;
a temperature-sensing unit disposed inside at least one of the first plate, the second plate, or the third plate; and
a heating unit disposed inside at least one of the first plate, the second plate, or the third plate,
wherein each of the heating unit and the temperature-sensing unit comprises a resistor, and
wherein at least one of the heating unit or the temperature-sensing unit is integrated with one of the plurality of individual electrodes and the common electrode.

6. The liquid lens according to claim 5, wherein the plurality of individual electrodes or the common electrode integrated with at least one of the heating unit or the temperature-sensing unit has a patterned shape.

7. The liquid lens according to claim 2, wherein the temperature-sensing unit or the heating unit is disposed near the common electrode, and is connected to a part of the common electrode.

8. A camera module, comprising:
the liquid lens according to claim 2; and
a control circuit configured to control a temperature of the liquid lens,
wherein the control circuit comprises:
a sensing voltage supply unit configured to supply a sensing voltage to the temperature-sensing unit in response to a sensing control signal;
a heating voltage supply unit configured to supply a heating voltage to the heating unit in response to a heating control signal;
a temperature calculation unit connected to the temperature-sensing unit to calculate a temperature of the liquid lens; and
a temperature control unit configured to generate the sensing control signal and to generate the heating control signal in response to the calculated temperature.

9. The camera module according to claim 8, wherein the temperature control unit compares the calculated temperature with a predetermined temperature range, and controls a level or generation of the heating control signal based on a result of comparison.

10. A method of controlling a liquid lens operating in the camera module according to claim 8, the method comprising:
sensing a temperature of the liquid lens;
determining whether the sensed temperature falls within a predetermined temperature range; and
when the sensed temperature is lower than the predetermined temperature range, causing the heating unit to generate heat, and performing again the sensing the temperature.

11. The liquid lens according to claim 2, wherein the heating unit is disposed in contact with the common electrode or the individual electrodes.

12. The liquid lens according to claim 2, wherein the temperature-sensing unit is disposed in contact with the common electrode or the individual electrodes.

13. The liquid lens according to claim 2, wherein one of the heating unit and the temperature-sensing unit includes metal.

14. The liquid lens according to claim 2, wherein the temperature-sensing unit or the heating unit is disposed between adjacent individual electrodes in a plan view, and is connected to one of the adjacent individual electrodes.

15. The camera module according to claim 9, wherein the predetermined temperature range is 20° C. to 60° C.

16. The liquid lens according to claim 1, wherein the temperature sensing unit is located on an outer surface of the first plate so as to be disposed between the outer surface of the first plate and the at least one of the second plate or the third plate.

17. The liquid lens according to claim 2, wherein the heating unit is located on an outer surface of the first plate so as to be disposed between the outer surface of the first plate and the at least one of the second plate or the third plate.

* * * * *